July 19, 1966

C. T. HUTCHENS 3,261,622

TANDEM AXLE SUSPENSION

Filed Oct. 8, 1963

INVENTOR

*Charles T. Hutchens*

BY *Cushman, Darby & Cushman*

ATTORNEYS

July 19, 1966 C. T. HUTCHENS 3,261,622
TANDEM AXLE SUSPENSION
Filed Oct. 8, 1963 3 Sheets-Sheet 2

INVENTOR
CHARLES T. HUTCHENS

BY
Cushman, Darby & Cushman
ATTORNEYS

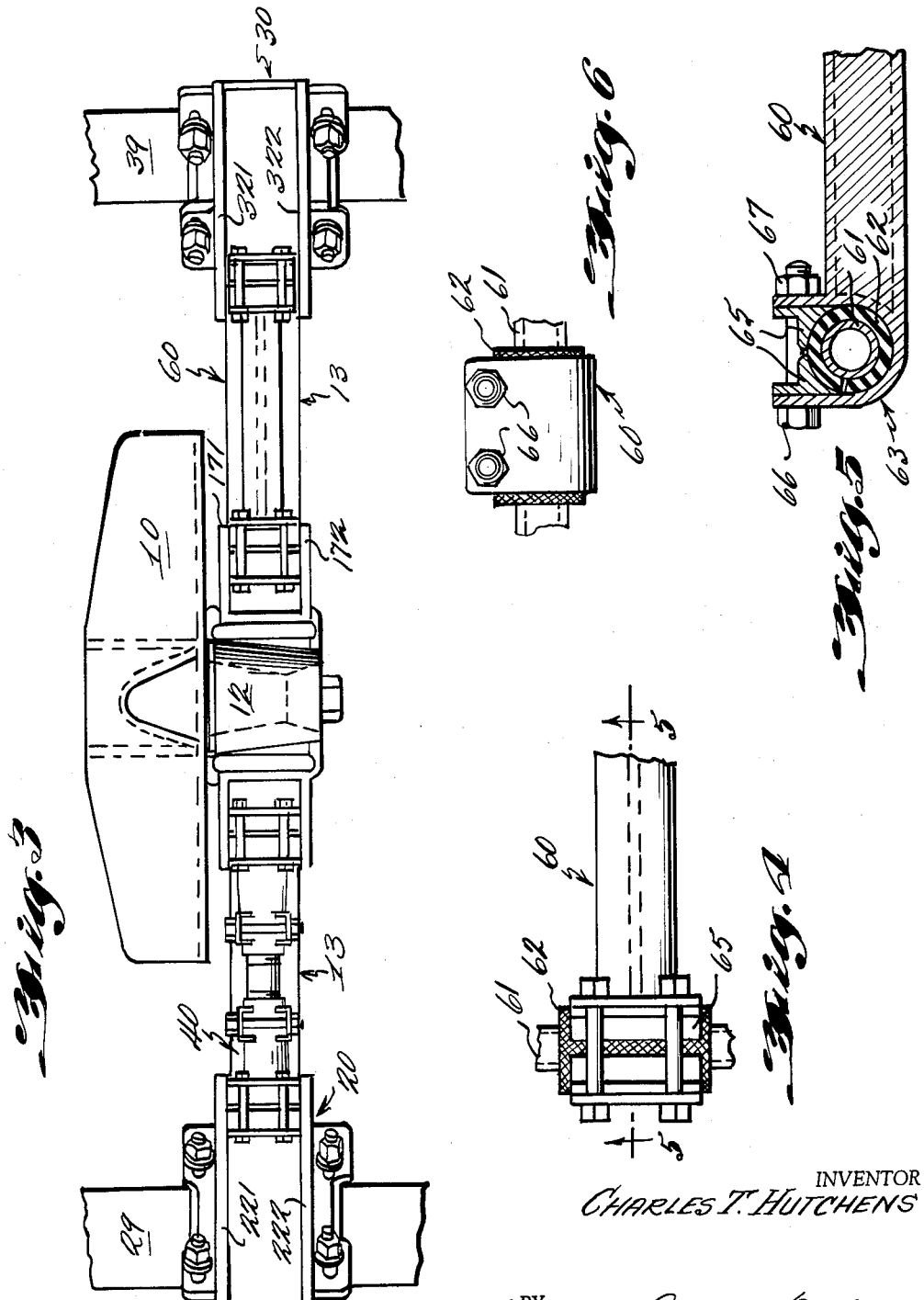

United States Patent Office 3,261,622
Patented July 19, 1966

3,261,622
TANDEM AXLE SUSPENSION
Charles T. Hutchens, Springfield, Mo., assignor to Hutchens & Son Metal Products, Inc., Springfield, Mo., a corporation of Missouri
Filed Oct. 8, 1963, Ser. No. 314,805
5 Claims. (Cl. 280—104.5)

The present invention relates to improvements in parallelogram-type tandem axle suspensions for dual rear axle vehicles. More particularly, the present invention relates to a novel parallelogram tandem axle suspension for trucks, trailers and the like, and to an improved arrangement for mounting and cushioning springs, torque arms and trunnion bearings for improved suspension alignment, greater tire and equipment life, greater safety and smoother riding characteristics.

In the parallelogram system, each axle is connected at each end to the frame of a vehicle by means of a pair of radius rods pivotally connected to extensions above and below the axle housing and to the vehicle frame so that the radius rods are essentially parallel and hence provide a "parallelogram" form of movement with respect to one another. Each side of the vehicle frame is supported on the axles by means of a curved leaf spring having its opposite ends supported on the axle and having its midportion pivotally supported on a trunnion shaft extending transversely of the vehicle frame. This arrangement of springs and radius rods prevents oscillation of the axles about their axes and confines the movement of the axles to an up and down path having a radius of curvature dependent upon the length of the radius rods. In trucks and other driven vehicles, the parallelogram arrangement also provides good control of the axle shaft flange angle with respect to the engine shaft flange angle and acts to balance the drive torque and braking forces within the structure.

There are serious disadvantages in known parallelogram suspensions, however, particularly where either or both of the tandem axles are driven axles. That is, in attempts to correct earlier parallelogram system problems arising from the action of universal joints and drive shafts to pivot as much as the driven axles themselves, creating disadvantages in mounting, lubricating, high stresses and faster wear, it was proposed to lower drive shafts and universal joints by including in parallelogram-type suspensions, a trunnion-mounted spring having opposite ends supported by the tandem axles. Radius rods were connected at inner ends to the frame and at outer ends to points above and below the axle housings. With a single multiple leaf spring and this radius rod assembly, this known arrangement allowed movement of the upper set of radius rods with the spring and allowed oscillatory movement of the axles about their axes.

In operation, this attempt at improvement suffered from severe disadvantages in absorbing sudden torque loads. That is, the movement caused thereby pulls or pushes on the upper radius rod connected to the drive axle and causes the spring to flex and oscillate on the trunnion mount and absorb shock in the spring connections at the axle. The brake reactions in this case then do not balance each other out as in the true parallelogram system. When the brakes are applied, the load is transferred from the drive or rear axle to the forward axle which brings the weights into unbalance.

In such cases, when brakes are applied to transfer at least some of the load from the rear axle to the front axle, the result is that the rear wheels will lose traction and may slide, resulting in excessive tire scuffing and often in dangerous side slipping of the vehicle. It had even been proposed to accentuate the weight shifting effect by providing larger and more powerful front brakes, or by modifying the rear brakes such that they are applied with less force than the front brakes, or by providing the rear brakes with brake linings of less efficiency than the linings of the front brakes.

If any of these alternatives are employed, the front brakes must do more than one-half of the total work in bringing the vehicle to a stop, with the result that the front brakes are overworked and their brake linings wear out faster than the rear brake linings, quite often being worked beyond the capacity of the brake drums to dissipate heat, with resulting heat cracks and accelerated destruction of the brake linings. It has also been proposed to compensate for the weight shifting effect by offsetting the load to cause the rear axles to carry more than one-half the total load when on level ground. This, of course, creates more wear on the rear tires and represents a condition that is not tolerated under the highway axle loading limitation laws of many states.

The present invention has for its principal object the provision of means to overcome all of the deficiencies noted above, permitting the use of brakes of equal size, efficiency, and effect; and permitting equally loaded axles and tires, while applying the braking effect to force the rear wheels firmly into contact with the ground.

A further object of the present invention is to provide means of the character described in which the leaf springs employed in a tandem axle suspension are firmly connected to the axles while permitting relative play between the axles and the springs, and between the axles and the trunnion mounting assembly, whereby the vehicle will perform efficiently on uneven terrain, the construction eliminating the disadvantageous tendencies of high stress and undue wear that known parallelogram tandem axle suspensions have been subject to.

The objects of the invention are accomplished by providing trunnion mounting brackets that are the only direct connection to the frame of a truck or other vehicle. Each such bracket is provided with two pivots which form trunnion bearing spindles and four multiple leaf springs, two on each side of the vehicle, are pivoted on these bearing spindles. The bearing spindles are fitted with spring clamps and U bolts by which the springs are clamped into place. The spring clamps have channel-shaped elements provided with flanges to receive one end of a torque arm, the latter together with the spring, being mounted to rotate independently of each other about the bearing spindles. Axle mounting housings are provided for attachment with the axles and are made to receive the ends of the springs in channel-shaped pockets above and below the axle. The springs are free to slide forward or backward in these pockets, but side movement is limited by the flanges forming the sides of the channel-shaped spring pockets. The axle mounting housings and the spring clamps are also formed with integrally cast center sleeves for receiving outer ends of the respective torque arms for mounting in connection with split resilient sleeves and wedge-shaped metal elements.

Other and further objects and advantages of the present invention, together with a better understanding thereof, will become apparent to those skilled in the art when reference is had to the accompanying drawings, in which:

FIGURE 3 is a plan view of the suspension shown in FIGURE 1;

FIGURE 4 is a plan view of a typical torque arm bearing arrangement according to this invention, on a scale somewhat enlarged from that shown in FIGURE 3 from which it is shown removed;

FIGURE 5 is a cross section taken along lines 5—5 in FIGURE 4 and illustrating the action of the wedge castings in retaining the rubber sleeve in the torque arm bearing assembly; and FIGURE 6 is a left end view of the torque arm shown in FIGURE 4.

Figure 1:
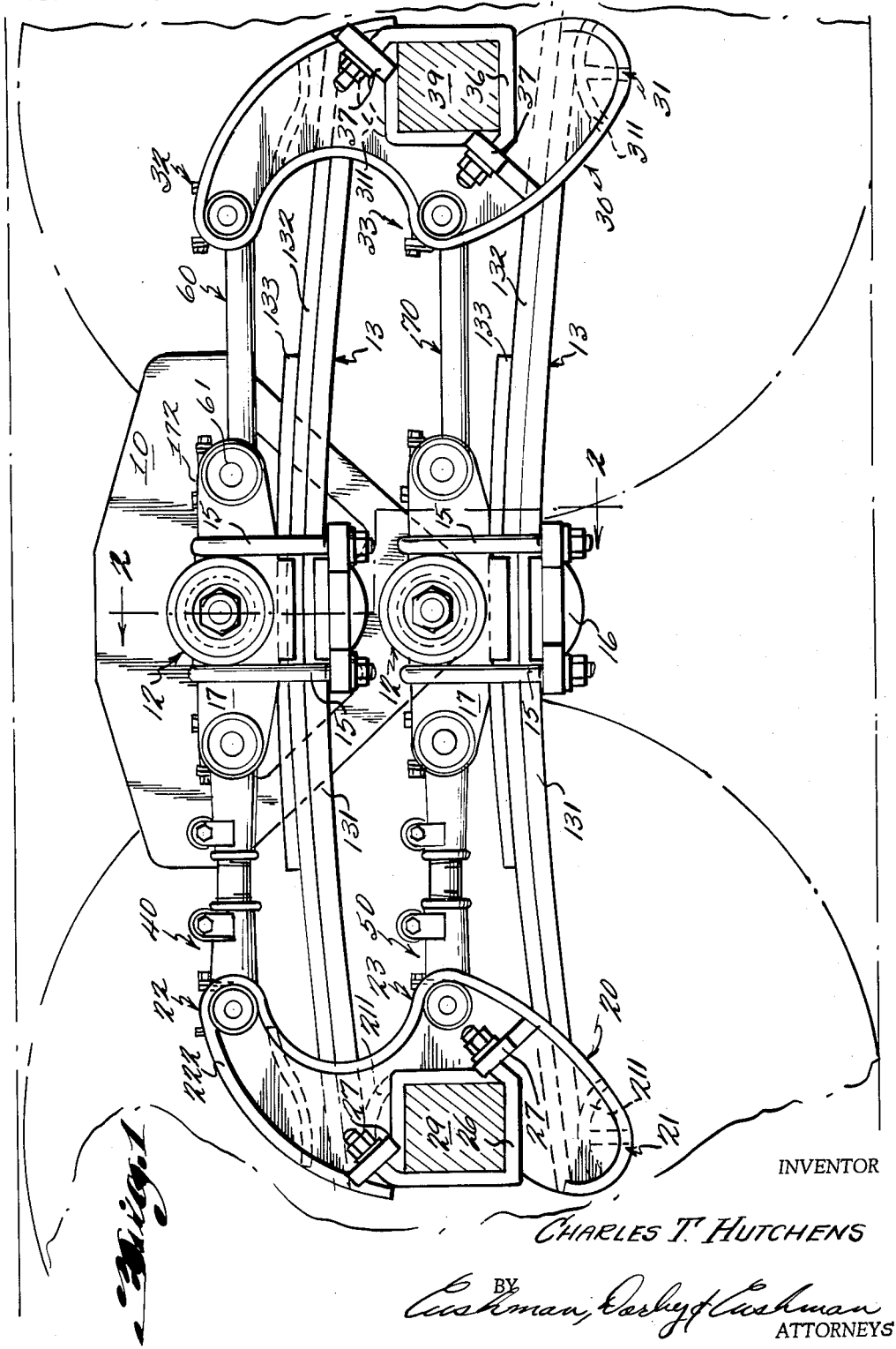
FIGURE 1 is a side elevation of a typical parallelogram suspension embodying the present invention, viewed from the outside with the tires removed.

Understandably, and according to this invention, the drawings disclose only one of a pair of suspension assemblies normally employed on a tandem axle vehicle, it being understood that a mirror image assembly to that shown in FIGURE 1 would also be employed on the opposite side of the vehicle. Further, and for convenience in identification of parts, identical reference numerals have been employed for similar parts appearing in more than one figure.

Figure 2:
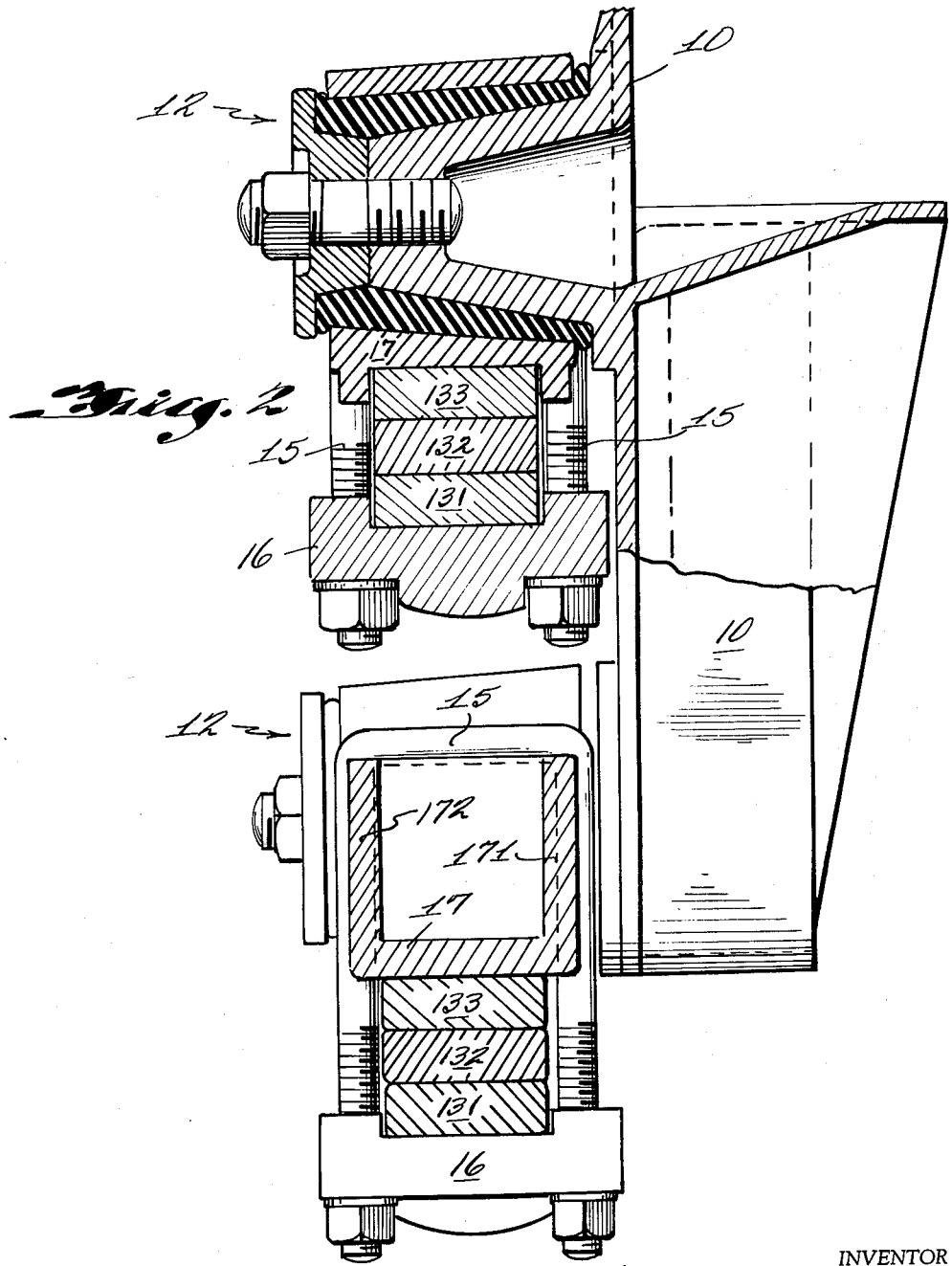
FIGURE 2 is a sectional end view, on an enlarged scale, taken along lines 2—2 of FIGURE 1, illustrating specific details of the trunnion mounting bracket and spring mounting assembly of this invention.

Turning now to FIGURES 1 to 3, a truck frame (not shown) may be provided with a trunnion mounting bracket 10 which is welded or otherwise secured to a side of the frame and extends below it. The trunnion mounting bracket 10 supports a pair of outwardly extending trunnion bearing spindles indicated generally at 12 for supporting the spring beams 13, herein shown as multi-leaf springs with individual leaves 131, 132 and 133. Both springs 13 are shackled in their central portions by means of U bolts 15—15, bottom spring clamp castings 16 and upper spring clamp castings 17 to fix the springs in position on the trunnion bearing spindles. The opposite ends of the spring beams 13 rest within the axle mounting castings indicated generally at 20 and 30 and are movably supported therein in a known way, for example, upon the upper surface of the bevelled spring retainers 211 and 311 within the respective axle housing castings, to support the axles 29 and 39.

Each of the axle mounting castings is provided with upper extensions 22 and 32, and central extensions 23 and 33 for connection with torque arm assemblies 40, 50, 60 and 70 (described hereinafter) for maintaining the spacing of the axles 29 and 39. The axle mounting casting 30 for the rear axle 39, for example, is provided with an upper extension 32, and a lower extension 33 which straddles axle 39. The axle mounting castings are clamped to the axle by means of U bolts 26 and 36 extending through the flanges 27—27 and 37—37 on opposite sides of the axles 29 and 39 in the respective axle mounting castings.

The upper end of the extensions 22 and 32 are slotted or generally channel-shaped, as indicated in FIGURE 3 so that the opposite flanges 221 and 222 of the channel are adapted to receive between them the outer end of the torque arm indicated generally at 40. The spring retainers 211 and 311 may be located between similar lower flanges in bottom extensions 21 and 31 of the respective axle mounting castings.

Referring to FIGURES 4, 5 and 6, in connection with the torque arms, a center sleeve such as 61 of non-adjustable torque arm 60 is cast in and made a part of the spring clamp portion 17 of the trunnion bearing castings 12, and a similar such sleeve is integrally cast with the axle mounting castings 20 and 30. Split rubber sleeves 62 acting as resilient bushings are mounted around the hollow shafts of center sleeves 61 followed by assembly of the substantially U- or horseshoe-shaped torque arm ends 63. Finally, the wedge castings 65 are placed over the rubber sleeves 62 and then the clamp bolts 66 are inserted and the nuts 67 thoroughly tightened. The action of these clamp bolts tend to draw the torque arm ends together and force the wedge castings into the rubber sleeve. By this arrangement the rubber sleeve is pressed tight against the shaft of center sleeve 61 and held securely on the outside thereof to prevent slipping between the contacting rubber and metal surfaces.

As shown, the left end 63 of torque arm 60 is pivotally connected to flanges 171 and 172 by means of the integrally cast sleeves and the other end of the torque arm is pivotally connected to flanges 321 and 322 on upper extensions 32 which also provide a channel-shaped area for reception of the torque arm. It will be understood that the split rubber sleeve such as 62 will permit some flexibility of the torque arm in terms of limited rotation, pivotal movement and tilting or twisting of the axles transversely of the frame.

The upper extension 22 on the front axle housing 20 is similarly connected to the upper spring clamp casting 17 by means of the adjustable torque arm 40, and the lower extension 23 on the front axle housing 20 is pivotally and rotatably connected to torque arm 50 at one end and the opposite end of the adjustable torque arm 50 is connected to the spring clamp casting 17 for pivoting and rotary movement as described above by means of a pivot sleeve such as 61. The lower extension 33 on the rear axle housing 30 is connected by means of non-adjustable torque arm 70 to the spring clamp casting 17 on the lower trunnion bearing casting in a similar manner.

In operation, the use of two pivoted springs on each side of a vehicle allows vertical movement of the axles as the vehicle moves over uneven ground in a true parallelogram action with very little movement between the spring ends and the axle mounting housings, while angular motion of the torque arms is practically nothing. These features are very important if long and trouble-free operation is to be expected. In this tandem assembly, bearing areas are doubled and body weight is transferred to the axles through four points of contact between the springs and the axle housing, and the frictional forces and wear between these parts are reduced by half for a longer wearing life.

During steering of any tandem unit, it is also recognized as necessary to slide the axles sidewise, which takes a sizable force. With the present tandem assembly, four sets of lead springs are at work along with four trunnion bearings and eight torque arms to create the necessary lateral pressure to slide the axles sidewise. This tandem thus has all of the desirable features such as elimination of hop, equal weight distribution, large oscillation movement and completely adjustable axle spacing for true alignment.

It is to be understood that various changes and modifications may be made in the foregoing description, without departing from the spirit of this invention. Accordingly, the present invention is only to be limited to the extent shown by the following claims.

What is claimed is:

1. A tandem axle suspension for a tandem axle vehicle comprising a trunnion mounting means on each side of the vehicle, a pair of wheel mounting axles extending at equal distances before and after each trunnion mounting means, upper and lower multiple leaf springs extending longitudinally of the vehicle vertically spaced with respect to said trunnion mounting means, upper and lower spring mounting members rotatably mounted upon said trunnion mounting means and each supporting the respective upper or lower multiple leaf springs thereon, axle mounting means having upper and lower multiple leaf spring retaining means for freely joining the respective upper or lower multiple leaf spring end to the lower adjacent axle, means rigidly securing each of said multiple leaf spring mounting members to its associated multiple leaf spring with the ends of said multiple leaf spring respectively joined to said multiple leaf spring retaining means, a plurality of channel-shaped elements in each of said axle mounting means, a plurality of channel-shaped elements on each of said multiple leaf spring mounting members, each of said channel-shaped elements having an integral transverse sleeve therein, and a plurality of torque arms having shaped ends to operatively engage one of said integral transverse sleeves, each torque arm being pivotally connected at one end on the transverse sleeve of a channel-shaped element in each axle mounting means and each torque arm being pivotally connected at the other end on the transverse sleeve of a channel-shaped element on each multiple leaf spring mounting member.

2. The tandem axle suspension of claim 1 wherein the torque arms are mounted in pairs and one torque arm of each pair is adjustable such that the distance between the ends of said torque arm can be increased or decreased.

3. The tandem axle suspension of claim 1 wherein resilient bushings are disposed about said integral sleeves, and the torque arm ends are pivotally received on said resilient bushings.

4. A tandem axle suspension for supporting a vehicle frame on a pair of axles comprising for each side of said vehicle frame, trunnion mounting means for rocking movement in a substantially vertical plane, a housing member fixed to each axle and extending above and below the same, a pair of spring, upper and lower spring means pivotally mounted on upper and lower spring mounting spindles on said trunnion mounting means for connecting said housing member with said trunnion mounting means on each side of the vehicle, each housing member and each of said spring mounting spindles having an integral transverse sleeve thereon, and a plurality of torque arms having shaped ends to operatively engage one of said integral transverse sleeves, each torque arm being pivotally connected at one end to the transverse sleeve of a housing member and at the other end to the transverse sleeve of a spring mounting spindle, a resilient bushing disposed about each transverse sleeve, and wedge shaped elements disposed in each torque arm shaped end for compressing the resilient bushing about the respective transverse sleeve.

5. In a vehicle suspension system, a torque arm receiving member integrally formed therein, a center sleeve member rigidly received within said torque arm receiving member, a resilient bushing surrounding said center sleeve member, and a substantially U-shaped torque arm end surrounding said resilient bushing, said torque arm end holding a pair of wedge-shaped members in removable and restraining relationship against said resilient bushing, said torque arm end being one of a pair of such torque arm ends connected together by rigid means at a predetermined distance from one another and thereby providing resilient connection between distinct torque arm receiving elements in said vehicle suspension system.

References Cited by the Examiner

UNITED STATES PATENTS

| 1,699,530 | 1/1929 | Gurnet | 104—5 |
| 2,096,530 | 10/1937 | Alden | 280—104.5 |
| 2,381,624 | 8/1945 | Simonds | 104—5 |
| 3,033,589 | 5/1962 | Behnke | 280—104.5 |

FOREIGN PATENTS 1,120,905  12/1961  Germany.

BENJAMIN HERSH, *Primary Examiner.*

MILTON BUCHLER, *Examiner.*

P. GOODMAN, *Assistant Examiner.*